United States Patent [19]
Brass

[11] Patent Number: 5,673,722
[45] Date of Patent: Oct. 7, 1997

[54] LIQUID INJECTION DEVICE, SYSTEM AND METHOD

[75] Inventor: Jack Brass, North York, Canada

[73] Assignee: Brasscorp. Ltd., Toronto, Canada

[21] Appl. No.: 385,643

[22] Filed: Feb. 8, 1995

[51] Int. Cl.⁶ .......................... G01M 3/22; G01F 15/06
[52] U.S. Cl. .................. 137/15; 137/205.5; 137/559; 62/77; 62/125; 62/292; 116/276
[58] Field of Search .................. 137/205.5, 559, 137/15; 116/276; 62/77, 292, 125, 129

[56] References Cited

U.S. PATENT DOCUMENTS

| | | | |
|---|---|---|---|
| 2,570,322 | 10/1951 | Christopher | 116/276 X |
| 2,725,844 | 12/1955 | Wittlin | 116/276 |
| 2,744,488 | 5/1956 | Wittlin | 116/276 |
| 2,843,078 | 7/1958 | Wittlin | 116/276 |
| 3,302,421 | 2/1967 | Karnes | 62/77 |
| 3,785,163 | 1/1974 | Wagner | 62/77 |
| 3,874,323 | 4/1975 | Röttig | 116/276 |
| 3,935,713 | 2/1976 | Olson | 62/77 |
| 3,937,029 | 2/1976 | Grahl et al. | 62/77 |
| 4,094,383 | 6/1978 | Thrasher, Jr. | 137/205.5 X |
| 4,745,772 | 5/1988 | Ferris | 62/292 |
| 4,884,410 | 12/1989 | Bell et al. | 62/77 |
| 4,938,063 | 7/1990 | Leighley | 73/40.7 |
| 5,167,140 | 12/1992 | Cooper et al. | 73/40.7 |

*Primary Examiner*—John Rivell
*Attorney, Agent, or Firm*—Fitzpatrick, Cella, Harper & Scinto

[57] ABSTRACT

A liquid injector has a tubular body surrounding and shielding a glass tube. The body and tube are sealed at opposing ends by a valve coupler and an end fill cap, each with there own O-ring seals. There are three openings through the body to allow for viewing of the contents of the tube, and to allow for light to pass into the tube. The injector is connected at the valve coupler through a hose and an on-off valve to the low side of an air conditioning system. It is connected through the end fill cap to a refrigerant charging system. The valve is shut off and the end fill cap is removed. The body is held upright and the liquid to be injected is poured into the glass tube. The fill end cap is replaced and the valve turned on. The charging system propels the liquid into the air conditioning system. The tube can be viewed through the openings to determined that a sufficient quantity of the liquid has been propelled from the injector.

21 Claims, 2 Drawing Sheets

LIQUID INJECTION DEVICE, SYSTEM AND METHOD

FIELD OF THE INVENTION

The invention relates to devices for injecting liquid into pressurized systems. More particularly, it relates to such devices for injecting liquids into air conditioning systems.

BACKGROUND OF THE INVENTION

Air conditioning systems often leak refrigerant. This is undesirable from an economic point of view as the system will not operate as efficiently with reduced quantities of refrigerant, and the refrigerant needs to be replaced. It is also undesirable environmentally.

Leak detection is generally performed by injecting a fluorescent dye into the system. Typically dyes used for this purpose fluoresce in the ultraviolet region, so an ultraviolet light is shone on the system. Wherever leaks occur the dye will escape the system and fluoresce under the light.

A number of injectors have been developed for getting liquids into an air conditioning system. U.S. Pat. No. 4,745,772 issued May 24, 1988 to Ferris describes a chemical additive device. The device has a container that unscrews to allow access to the interior for pouring in the additive. The container is screwed back together, the device is connected to the air conditioning system and the additive is injected under pressure into the system. Although there is no indication in the Ferris patent of the material used for the container, it is likely to be metal or some other visually solid material capable of withstanding the pressures used in air conditioning systems.

U.S. Pat. No. 4,938,063 issued Jul. 3, 1990 to Leighley discloses a mist infuser for infusing a fluorescent dye into an air conditioning system. The Leighley infuser has two concentric glass cylinders sandwiched between two circular end caps. Together the end caps and the small cylinder define a reservoir. One end cap has a circular inlet through its centre, while the other has an outlet. An inlet bore opens from the outlet, perpendicular to it, through the circumference of the outlet end cap. Similarly, an outlet bore opens to the inlet from the circumference of the inlet end cap. The bores have respective sealing caps.

In operation, the infuser is turned on its side and the sealing caps are removed. The dye is added through the inlet bore, while air escapes through the outlet bore. The level of the dye is visible through the glass cylinders.

The Leighley device has a number of drawbacks. It is expensive to manufacture and assemble due to the number of components and their specialized nature. The device must be filled on its side which is very cumbersome. The glass is susceptible to being broken. This is the likely reason for having two glass cylinders, one inside the other, to contain the dye in the event of breakage. Even if the glass is not broken, it is susceptible to being scratched, possibly, impairing sight to the interior.

It is an object of the invention to address these or other problems with devices for the injection of liquids into pressurized systems.

SUMMARY OF THE INVENTION

In a first aspect the invention provides an injector for use in injecting a liquid into a pressurized system using a charging system. The injector has a generally tubular body having a generally tubular interior. A non-opaque tube is inserted into the interior of the body. The body receives fluid connections at opposing ends of the body to the charging system and to the pressurized system, respectively. At least one opening through the tubular body, not at the opposing ends, is used for viewing the liquid in the tube. The tube and body are in sealed connection such that the liquid will not escape through the at least one opening while under pressure. The tube and body receive the liquid prior to injection into the pressurized system.

The tube may be translucent or transparent, and it may be uncoloured. It may be a glass tube, possibly clear borosilicate glass.

A valve coupler at one of the opposing ends of the body may connect to an on-off valve between the coupler and the pressurized system. There may be an end fill cap at the other opposing end for connection to the charging system. The end fill cap may be manually releasable from the body to provide interior access to the injector for filling the tube with the liquid. The liquid may be poured into the injector through the interior access when the body is held sufficiently upright to retain the liquid.

The at least one opening may be at least two openings, one for viewing and the others for allowing light to pass into the tube.

The charging system may be a refrigerant charging system. The liquid may have a fluorescent dye component for leak detection. The pressurized system may be an air conditioning system.

In a second aspect the invention provides a liquid injection system made up of the pressurized system, charging system and injector of the first aspect.

In a third aspect the invention provides a method for operating the injector of the first aspect by the following steps. First, connect the opposing ends of the body to the charging system and to the pressurized system, respectively, while fluid connection to the pressurized system is disabled. Fill the tube and body in a generally upright position with the liquid. Second, enable fluid connection to the pressurized system. Third, inject the liquid into the pressurized system using the charging system. Fourth, view the tube through the opening to determine if a sufficient amount of the liquid was propelled from the injector by the charging system.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF THE PREFERRED EMBODIMENT

Figure 1:
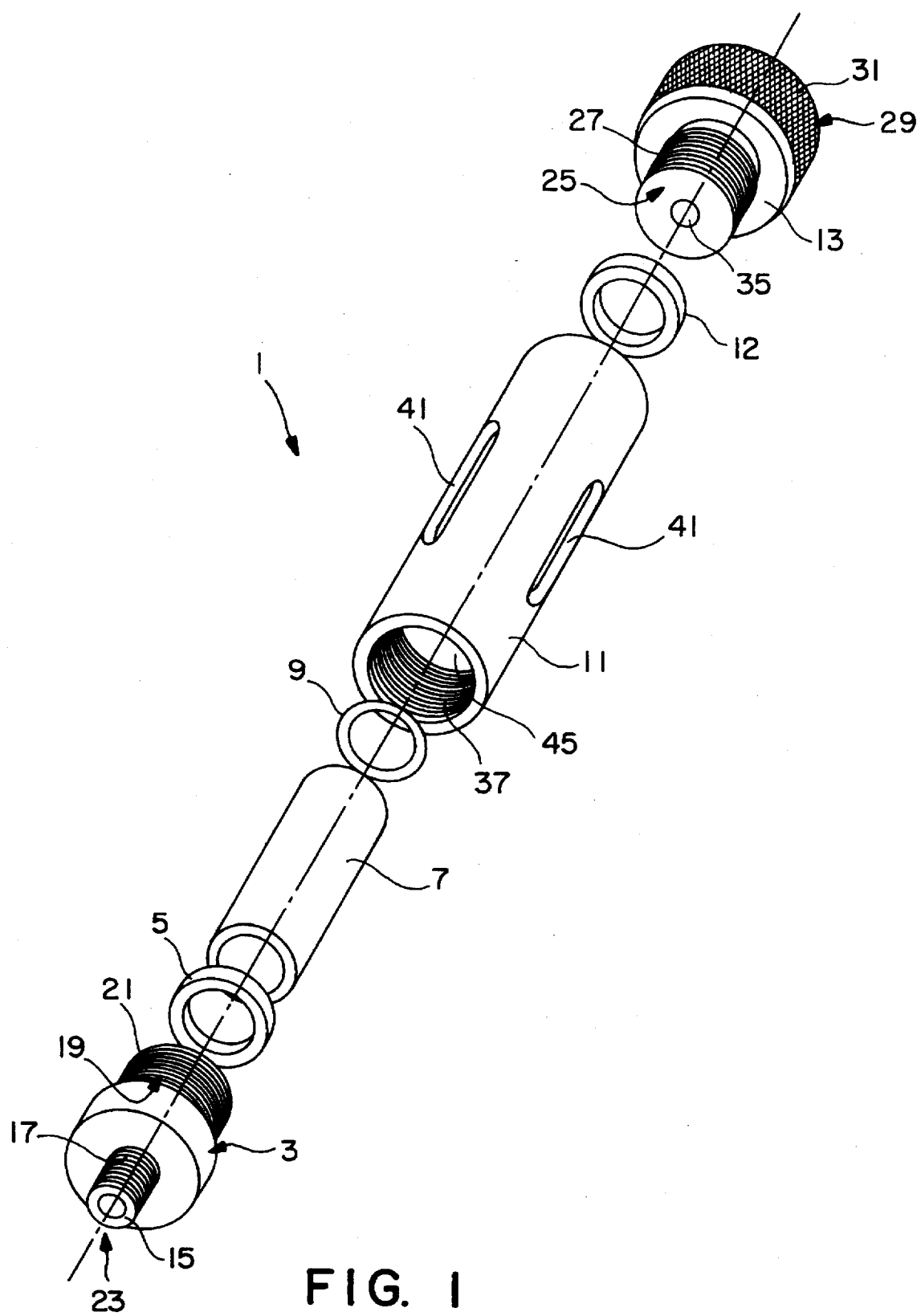
FIG. 1 is a perspective exploded view of an injector according to the preferred embodiment of the present invention.
Figure 2:
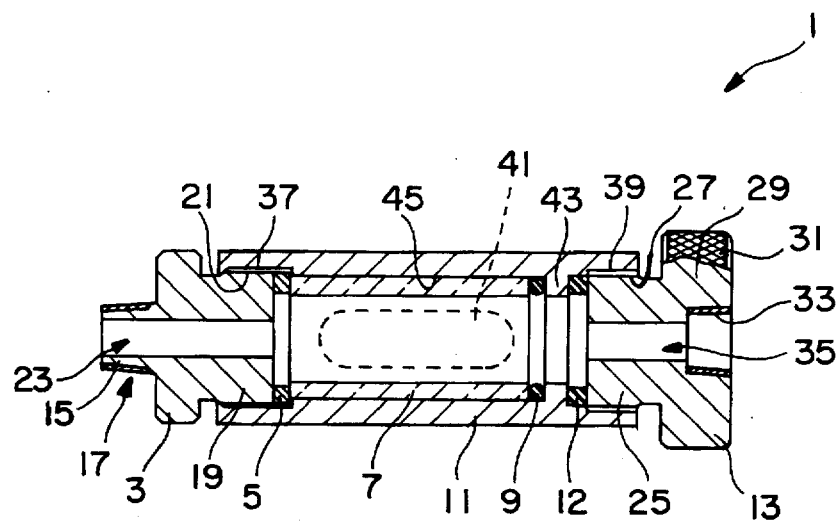
FIG. 2 is a cross-section of the injector of FIG. 1.

Referring to FIGS. 1 and 2, an injector 1 has a valve coupler 3, a valve coupler seal 5, a tube 7, a tube seal 9, a body 11, a fill cap seal 12, and a fill cap 13.

The coupler 3 has a conical nipple 15 with exterior thread 17, and a tubular plug section 19 with exterior threads 21. Through the centre of the coupler 3 is a bore 23.

The valve coupler seal 5 is a flat ring seal for durability, while the tube seal 9 and the fill cap seal 12 are O-ring seals.

Neoprene O-rings are used as they tend to expand outwardly as they are compressed thus providing additional sealing surface, while they rebound to their original position when compressive forces are removed thus reducing the tendency to stick to the surfaces that are compressing them. As well, neoprene has been found to be suitable for use with fluorescent dyes typical in automotive air conditioning applications. Those skilled in the art will recognize that other seals and sealing mechanisms may be used.

The tube 7 may be formed from any suitable material, such as borosilicate glass. The material should be chosen for specific clarity, strength and compatibility requirements of a given application. Although the tube 7 and the body 11 do not have to be tubular, this is certainly the easiest configuration for manufacturing purposes.

The fill cap 13 has a tubular plug 25 with exterior threads 27. The cap 13 has a grip section 29 with a roughened surface 31. Inside the grip section 29 about the centre of the cap 13 is a reverse conical thread 33 (see FIG. 2) into the cap 13. The thread 33 corresponds to the thread 21. Through the centre of the cap 13 is a bore 35.

The body 11 is tubular and has threads 37, 39 at opposing ends about its interior. Between the threads 37, 39 through the body, equally spaced about the axis of the body 11, are three openings 41 (two openings 41 are evident in FIG. 1, while only one is shown in FIG. 2). Beyond the threads 37 moving into the body 11, the internal diameter of the body 11 is narrowed by an annular projection 43. Between the projection 43 and the threads 39, the internal diameter of the body 11 widens to a support surface 45.

The injector 1 is assembled by inserting seal 9 into the body 11 past the threads 39 until it meets the projection 43. The tube 7 is inserted in a similar manner. The external diameter of the tube 7 and the internal diameter of the support surface 45 are matched to allow for expansion and contraction differences between the various materials at the temperatures likely to be encountered by the injector 1. A few thousands of an inch between the tube 7 and body 11 is usually sufficient at operating temperatures. The seal 5 is then inserted into the injector 1 and the coupler 3 threaded into the body 11. The coupler 3 squeezes the seals 5, 9 and creates a continuous surface from the projection 43 through the internal diameters of the seal 9, the tube 7, the seal 5 and the coupler 3.

To remove the tube 7, for cleaning, repair or replacement, the reverse process is followed.

The fill cap seal 12 is inserted to the opposite side of the projection 43 and the fill cap 13 is threaded into the body 11 until the fill cap 13 squeezes the seal 12 and creates a continuous surface from the projection 43 through the internal diameters of the seal 12 and the fill cap 13.

Figure 3:
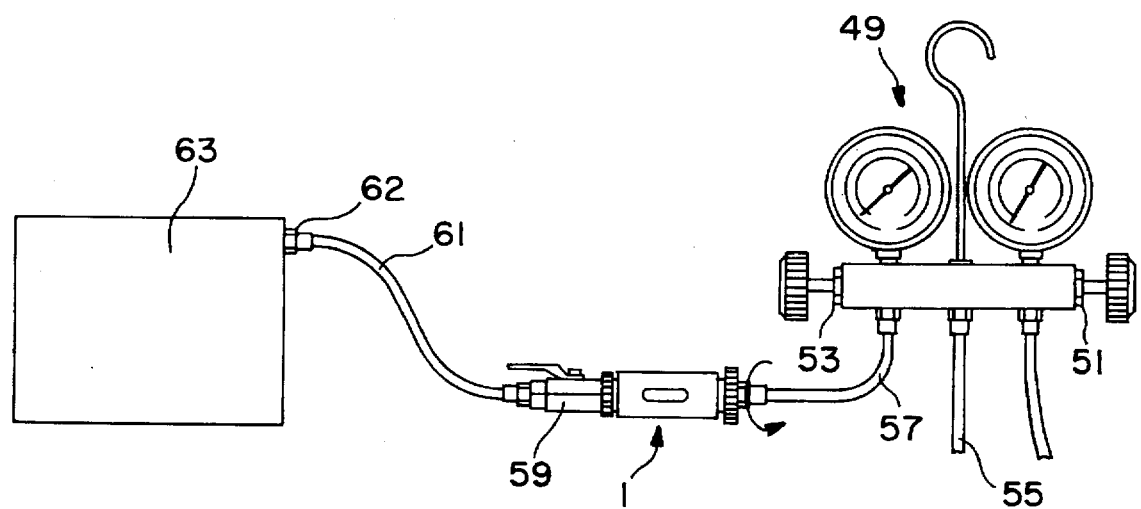
FIG. 3 is a sketch of the injector of FIG. 1 connected to a charging system and a pressurized system.

Referring to FIG. 3, a charging system 49 has a high pressure side 51 and a low pressure side 53 and is connected to a source of refrigerant supply 55. A low side hose 57 is connected from the charging system 49 and threaded into the threads 33 of the cap 13. The valve coupler 3 is threaded at the threads 17 into an on-off two way ball valve 59. Another suitable valve could be used, however a two way is recommended in case the injector 1 is connected backwards. The valve 59 is connected through a further low side charging hose 61 to the low side 62 of an air conditioning system 63.

In operation, the valve 59 is closed, the fill cap 13 is manually unthreaded from the body 11 at the threads 27 by gripping the roughened surface 31. The body 11 is held vertically and liquid to be injected into the air conditioning system 63 is poured into the tube 7 up to the threads for the fill cap 13. The fill cap is then re-threaded into the body 11. As is clear from FIG. 2, since tube 7 is sealed to body 11 via seal 9 and projection 43, no liquid can escape through holes 41. Accordingly, the fill end of the tube 7 is sealed to body 11 even when the fill end cap 13 is removed.

Excess liquid is squeezed out the threads 27 as the fill cap 13 is threaded. This ensures that a minimum of air is retained in the injector 1. Injecting air into an air conditioning system 63 could render the system 63 unstable and potentially dangerous.

The valve 59 is then opened to provide fluid connection to the air conditioning system 63. The charging system 49 is activated using refrigerant to propel the liquid from the injector 1 into the system 63. Having the valve coupler 3 immediately adjacent the valve 59 lessens the chance that air will be introduced between the injector 1 and the valve 59 and injected into the pressurized system.

Examples of liquids that can be used are a fluorescent dye, refrigerant oil combination used to detect leaks from the system 63 as the dye escapes from the system 63 and is made visible using an ultraviolet light. The dye has a distinctly different colour from refrigerant. The interior of the injector 1 can be viewed through one opening 41 and the tube 7, while light flows in the other openings 41 and the tube 7 to illuminate the interior. In this way one can check that the dye has been fully propelled from the injector 1.

The tube 7 must at a minimum be non-opaque to allow the user to determine if sufficient amounts of the liquid have been propelled. Determining a sufficient amount will depend on the particular application of the user. For better viewing it is preferable to use a transparent tube 7. The colour of the tube 7 must be compatible with the contents to be viewed. For example, some fluorescent dyes are yellow and refrigerant is clear so the use of a yellow tube 7 is not advisable. For the widest general use, the tube 7 will be clear.

The body 11 shields the tube 7 as the injector 1 may be subject to a good deal of knocking about in a shop or repair environment. The body 11 can be machined from aluminum or brass stock, with the valve coupler 3 and fill cap 13 separately manufactured, preferably from the same material as the body for compatibility purposes. The body 11 can be formed from other materials of suitable strength that are compatible with the liquid.

The preferred embodiment has been described with reference to injection of dye into an air conditioning system 63. For use with automotive air conditioning systems pressures are typically in the range of 145 to 180 psi. It will be evident to those skilled in the art that the principles described herein can be extended for use in other applications where liquids are to be injected under pressure. For example, the injector could be used to inject refrigeration oil or to inject chemical additives as described in U.S. Pat. No. 4,745,772 issued May 24, 1988 to Ferris mentioned previously.

It will be understood by those skilled in the art that this description is made with reference to the preferred embodiment and that it is possible to make other embodiments employing the principles of the invention which fall within its spirit and scope as defined by the following claims.

I claim:

1. An injector for use in injecting a liquid into a pressurized system using a charging system, the injector comprising:

a body having a generally tubular interior with a longitudinal axis, the body having fill and coupling ends disposed at opposite ends of the body and about the longitudinal axis, a non-opaque tube in the interior of the body and co-axial with the longitudinal axis of the body, the tube having fill and coupling ends at opposite ends of the tube and about the longitudinal axis, at least one opening through the body, not at the opposing fill and coupling ends, for viewing the liquid in the tube, a fill end cap, removably coupled to the fill end of said body, for filling the interior of the tube with the liquid;

sealing means disposed on an interior of said body between at least one said opening and the fill end of the body such that the fill end of the tube is sealed to the body even when said fill end cap is removed; and a coupler end cap, removably coupled to the coupler end of said body, for coupling said injector to the pressurized system when coupled to said body, and for sealing the tube between the coupler end cap and said sealing means.

2. An injector according to claim 1, wherein the tube is translucent.

3. An injector according to claim 1, wherein the tube is transparent.

4. An injector according to claim 1, wherein the tube is transparent and uncoloured.

5. An injector according to claim 1, wherein the tube is a glass tube.

6. An injector according to claim 5, wherein the glass is clear borosilicate glass.

7. An injector according to claim 1, wherein said coupler end cap comprises a valve coupler for connection to an on-off valve between the coupler end cap and the pressurized system.

8. An injector according to claim 1, wherein the fill end cap has a roughened exterior surface.

9. An injector according to claim 8, wherein the fill end cap is manually releasable from the body to provide interior access to the injector for filling the tube with the liquid.

10. An injector according to claim 8, further comprising an on/off valve coupled to said coupler end cap so that when the liquid is poured into the injector through the fill end of the body when the body is held upright, the liquid is retained in the tube.

11. An injector according to claim 1, further comprising at least two openings in the body for viewing the tube and for allowing light to pass into the tube.

12. An injector according to claim 1, wherein the charging system is a refrigerant charging system, the liquid comprises a fluorescent dye for leak detection, and the pressurized system is an air conditioning system.

13. An injector according to claim 1, wherein said sealing means comprises an annular projection disposed on the inside of said body adjacent the body fill end.

14. An injector according to claim 1, further comprising an annular seal disposed between said tube and said coupler end cap to prevent the liquid in the tube leaking at a periphery of the coupler end cap.

15. A liquid injection system for use with a charging system and a pressurized system, for injecting a liquid into the pressurized system, the liquid injection system comprising:

a body having a generally tubular interior with a longitudinal axis, said body having a fill end about said axis for coupling the body to the charging system, and a coupler end about said axis for coupling the body to the pressurized system;

a non-opaque tube for being inserted into the interior of the body and co-axial with the longitudinal axis;

a removable fill end cap, removably coupled between the body fill end and the charging system for pouring the liquid into the tube when the fill end cap is removed from the body;

a coupler end cap, removably coupled between the body coupler end and the pressurized system, for permitting the tube to be removed from the body coupler end when the coupler end cap is removed from the body;

at least one opening through the tubular body, not at the opposing ends thereof, for viewing the liquid in the tube, sealinq means coupled to an interior of said body between at least one said opening and said fill end of the body such that said tube is sealed to the body even when the fill end cap is removed from the body; and an on/off valve, coupled to said coupler end cap, for allowing the liquid to enter the pressurized system when the valve is on, and for preventing the liquid from entering the pressurized system when the valve is off.

16. A system according to claim 15, wherein said sealing means comprises an annular projection integral with the interior of the body adjacent the fill end thereof.

17. A system according to claim 16, further comprising an annular seal disposed between the annular projection and the tube to prevent the liquid in the tube from leaking about a periphery of the fill end cap.

18. An injector according to claim 17, further comprising an annular seal disposed between said tube and said coupler end cap to prevent the liquid in the tube leaking at a periphery of the coupler end cap.

19. A method for charging a pressurized system with liquid using a charging system, the method comprising the steps of:

connecting an injector comprising;

a body having a generally tubular interior with a longitudinal axis, the body having fill and coupling ends disposed at opposite ends of the body and about the longitudinal axis;

a non-opaque tube in the interior of the body and co-axial with the longitudinal axis of the body, the tube having fill and coupling ends at opposite ends of the tube and about the longitudinal axis;

at least one opening through the body, not at the opposing fill and coupling ends, for viewing the liquid in the tube, viewing the tube through at least one opening in the tubular body to determine if a sufficient amount of the liquid was propelled from the injector into the pressurized system by the charging system.

20. A method according to claim 19, further comprising the step of disposing the body so that the fill end faces downward, to ensure that the tube does not exit the fill end of the body.

21. A method according to claim 19, further comprising the steps of:

disposing an on/off valve at the coupler end cap to control flow of liquid therethrough;

closing the on/off valve prior to filling the tube with the liquid; and opening the on/off valve to enable the liquid to flow to the pressurized system.

* * * * *